July 31, 1951 — E. M. SPLAINE — 2,562,750
OPHTHALMIC MOUNTING
Filed Dec. 3, 1946 — 2 Sheets-Sheet 1

INVENTOR
EDWARD M. SPLAINE
BY Louis L. Gagnon
ATTORNEY

July 31, 1951  E. M. SPLAINE  2,562,750
OPHTHALMIC MOUNTING
Filed Dec. 3, 1946  2 Sheets-Sheet 2
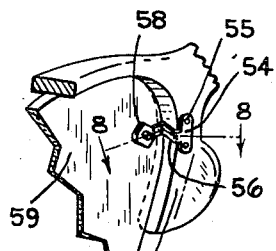
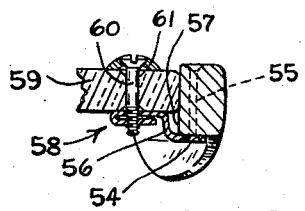
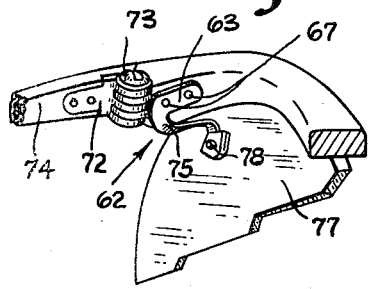
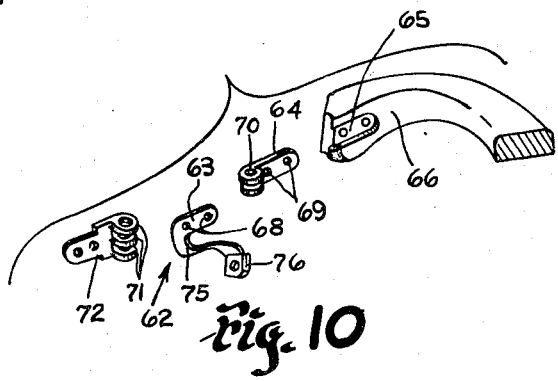
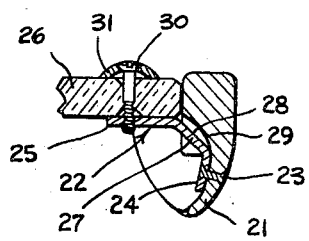
INVENTOR
EDWARD M. SPLAINE
BY
ATTORNEY Patented July 31, 1951

2,562,750

UNITED STATES PATENT OFFICE 2,562,750

OPHTHALMIC MOUNTING

Edward M. Splaine, Southbridge, Mass., assignor to American Optical Company, Southbridge, Mass., a voluntary association of Massachusetts Application December 3, 1946, Serial No. 713,743

4 Claims. (Cl. 88—41)

This invention relates to ophthalmic mountings and has particular reference to a mounting embodying a semi- or half-rim structure preferably formed of non-metallic material and method of making the same.

One of the principal objects of the invention is to provide a semi- or half-rim type mounting having novel means and method of assembling and securing the lenses in proper position with said mounting.

Another object is to provide a lens supporting structure of the above character with lens securing members on the nasal and temporal sides thereof and novel means and method of securing said members to the lens supporting structure.

Another object is to provide resilient adjustable lens connections which will support the lenses in proper aligned relation with the lens supporting structure and which will be substantially inconspicuous from the front.

Another object is to provide resilient lens connection means whereby any shock against the lenses will be absorbed by the said lens connection and which will prevent distortional strain on the lens supporting structure from being directed to the lenses.

Other objects and advantages of the invention will become apparent from the following description taken in connection with the accompanying drawings and it will be apparent that many changes may be made in the details of construction, arrangement of parts and methods shown and described without departing from the spirit of the invention as expressed in the accompanying claims. I, therefore, do not wish to be limited to the exact details of construction, arrangement of parts and steps of the methods shown and described as the preferred forms are given only by way of illustration.

Referring to the drawings:

Fig. 7 is a fragmentary sectional view of a modified form of nasal lens connection;

Fig. 8 is a sectional view taken on line 8—8 of Fig. 7;

Fig. 9 is a fragmentary perspective view of a modified form of temporal lens connection;

Fig. 10 is an exploded view of the connection shown in Fig. 9; and

Fig. 11 is a sectional view taken on line 11—11 of Fig. 5.

Figure 1:
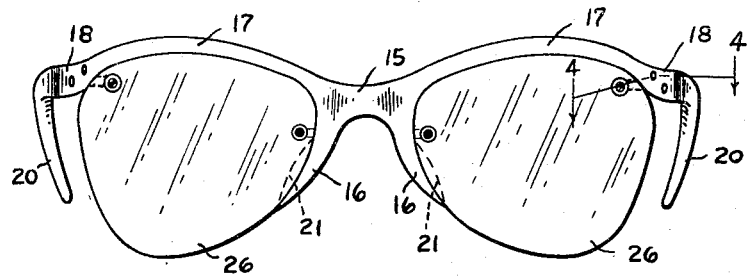
Fig. 1 is a front elevational view of the mounting embodying the invention.
Figure 2:
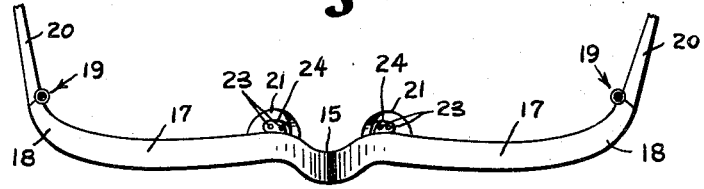
Fig. 2 is a top plan view of the mounting shown in Fig. 1.
Figure 3:
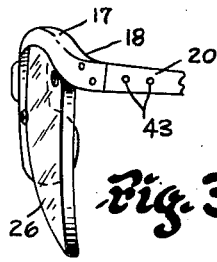
Fig. 3 is a partial side view of the mounting shown in Fig. 1.
Figures 5, 6:
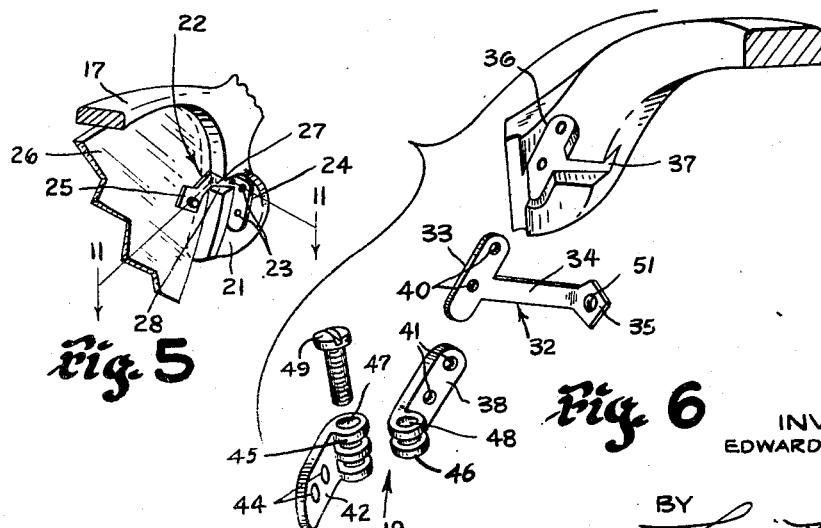
Fig. 5 is a fragmentary sectional view showing the nasal lens connection.
Fig. 6 is an exploded view of the temple hinge and temporal lens connection.

Referring more particularly to the drawings wherein like characters of reference designate like parts throughout the several views, the mounting embodying the invention comprises a bridge member 15 having integrally related side portions 16 and integrally related long and slender rim portions 17 shaped to follow substantially the upper contour shape of the lenses and terminating in temple connection ends 18. The temple connection ends 18 are curved rearwardly, as best shown in Fig. 2, and support hinge members 19 to which the temples 20 are pivotally attached. The side portions 16 of the bridge member 15 are provided with rearwardly extending nose bearing pads 21 to which suitable lens straps 22 are attached by rivets or the like 23 which extend through openings formed in the integral plates 24 of the lens straps 22 and into the material of the nose bearing pads 21. The lens straps 22, which are best shown in Figs. 5 and 11, comprise plate portions 24, which are secured to the nose bearing pads 21 by the rivets or the like 23, the lens contacting ears 25 which are adapted to overlie a side surface of the lenses 26 and resilient connecting arms 27. The resilient arm 27, connecting the plate 24 with the lens contacting ear 25, is adapted to lie within a cut-out portion 28 in the adjacent part of the side portion 16. It will be seen that the resilient connecting arm 27 may be readily bent to properly position the lens contacting ear 25 with respect to the plane of the inner surface of the lens which is to be supported within the mounting. The resilient arm 27 is preferably not seated within the cut-out portion 28 but lies in spaced relation with the bottom surface 29, so that any shock which may be caused by a blow or the like on the lens from either the front or the back thereof will be taken up by the said resilient arm and not transferred to the mounting.

The lens contacting ears 25 are connected to the lenses 26 by any suitable lens connection means such as screws or the like 30 which are adapted to extend through the cupped washers 31, through the aligned openings in the lenses and into connection with the threaded openings in the lens contacting ears.

Figure 4:
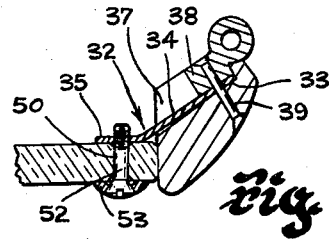
Fig. 4 is a fragmentary sectional view taken on line 4—4 of Fig. 1.

The temporal lens connection members 32, which are best shown in Figs. 4 and 6, embody plate-like portions 33 and resilient adjustable arms 34 extending from said plate-like portions and terminating in lens connection ends 35. The plate-like portions 33 are adapted to be seated within suitable recesses 36 which are located in the temporal ends 18 of the rim portions 17, with the adjustable arms 34 lying within and extending through the channels 37. This will position the lens connection ends 35 in overlying relation with the rear surfaces of the lenses. One of the temple hinge members 19 is provided with a plate-like portion 38 which is adapted to lie in superimposed relation with the portion 33 of the lens connection member 32 within the recess 36. When the portions 33 and 38 are in said overlying position they are secured to the rim portions 17 by means of the pins or the like 39 which are inserted through suitable openings 40 and 41 in the respective parts. The cooperating hinge member has a plate-like portion 42 which is adapted to be secured to the temple 20 by means of pins or the like 43 which extend through the openings 44. The temple hinge members 19 are provided with ears 45 and 46 which are adapted to interfit with each other and are provided with openings 47 and 48 which, when said members are in fitted relation, will be in alignment with each other. The hinge ears 45 and 46 are pivotally connected by means of the screw or the like 49.

The lens connection members 33 are preferably formed of a resilient material adapted to be self-adjusted so that the connection ends 35 will readily conform to the curvature of the rear surface of the lenses when being connected therewith. The lenses 26 are provided with connection openings 50, see Fig. 4, adapted to be aligned with the opening 51 of the connection ends 35. The said lenses are secured to the connection ends 35 by means of screws or the like 52 which extend through suitable cupped washers 53 which are adapted to engage the front surface of the lenses about the connection openings.

It may readily be seen from the foregoing description and the drawings, particularly Figs. 4 and 11, that the lenses may be quickly and easily assembled with the mounting and that the resilient arms 27 and 34 will absorb shock which may occur against the said lenses when the mounting is in position of use on the face of the wearer and will also relieve the lenses from distortional strain which might be directed to the lens supporting structure.

Figs. 7 and 8 show a modified form of the invention as regards the nasal lens connection. In the construction shown in Figs. 7 and 8 the lens connection member comprises a plate-like portion 54 adapted to overlie a rear side surface of the side portion 16 and to be attached thereto by means of the pins or the like 55 which are adapted to extend through said plate-like portion and the adjacent side portion. The plate-like portion 54 has an integral resilient arm 56 extending outwardly therefrom to a point adjacent the inner edge of said side portion where it is bent inwardly substantially parallel to the inner surface 57 of the side portion 16, thence outwardly substantially normal to the said inner surface 57 and terminating in a lens connection end 58 which is adapted to engage the rear surface of the lens 59. The lens connection end 58 is formed by bending the end of the arm 56 back upon itself and has suitable aligned threaded openings adapted to receive the screw 60. By forming the lens connection end 58 in the manner shown and described the resiliency of the material which urges the bent end outwardly against the pull of the threads of the screw during the tightening thereof forms the equivalent of a lock washer in that it will prevent the screw 60 from loosening when the lenses are mounted. The screw 60 is inserted through a suitably cupped washer 61 which is adapted to engage the front or opposed surface of the lens about the connection opening therein. It is to be understood that the arm 56 may be bent or adjusted to align the openings in the lens connection end with the opening in the lens thereby compensating for any differences in the distance from the edge of the lens to the center of the hole and the resiliency of the arm will allow the lens connection end to be self-adjusting to the angle of the adjacent surface of the lens and will relieve the lens from shock and strain.

In Figs. 9 and 10 there is shown a modified form of the temporal lens connection means which comprises a lens connection member 62 having a plate-like portion 63 adapted to overlie the hinge member 64. The hinge member 64 is adapted to lie within the cut-out 65 formed in the temple end of the rim portion 66 and to be secured thereto by means of pins or the like 67. The plate-like portion 63 is provided with suitable openings 68 which are adapted to be aligned with the openings 69 in the hinge member 64. The pins 67 are adapted to extend through the rim portion 66, the openings 69 in the plate-like portion 63 of the hinge member and the openings 68 of the lens connection member 62 thereby securing the several parts in assembled relation with each other. The hinge member 64 is provided with ears 70 which, when in assembled relation with the ears 71 of the temple hinge member 72 by means of the screw 73 will provide pivotal means for the temple 74.

The lens connection means 62 is provided with a resilient intermediate portion 75 adapted to be self-adjusting to the adjacent contour of the lens and will allow the connection end 76 to be free to assume its proper position in overlying relation with the rear surface of the lens 77. The connection end 76 is formed in a manner similar to the end 58 shown in Figs. 7 and 8 and described above and is secured to the lens by means of the screw or the like 78.

It is particularly pointed out that the base of the channels 37 are so formed as to be in spaced relation with the arms 34 as shown in Fig. 4 and that the bottom surface 29 lies in spaced relation with the arm 27 of the lens strap 22 as shown in Fig. 11 when the parts are in assembled relation with each other and thereby permits said arms to be free to flex rearwardly or forwardly for relieving strain on the lenses should said lenses be subjected to impact or distortional strain directed to the lens supporting structure. The arms being formed of relatively thin resilient material will tend to absorb such shock and strain and will simultaneously permit the strap ears to be self-adjusting to the inner surface shape of the lenses so as to intimately fit therewith when in assembled relation with said lenses.

In the construction shown in Figs. 9 and 10 the arm 75 is similarly spaced from the base of the slot in which it is fitted so as to permit free flexing, it being understood that this arm as well as the arm 56 shown in Figs. 7 and 8 is formed of relatively thin resilient material. By so forming the said arms they will be free to flex to assume the required angle to fit the inner adjacent surfaces of the lenses regardless of the inner surface curvatures of said lenses.

In each instance the point of attachment of the various arms with the lens supporting structure lies considerably rearwardly of the lens and the intermediate portions of the arm not only extending inwardly but also extending forwardly to the lens connection ends thereof.

It is also to be noted that the temple supporting ends of the lens supporting structure are positioned considerably above a horizontal line extending through the centers of the lenses thereby affording unobstructed side vision.

It is also pointed out that the portions 17 which extend outwardly of the bridge member 15 have a greater dimension in the direction of the thickness of the lens than in the plane of the lens and that the front and rear surfaces of said temple supporting ends converge towards each other in the direction of and abutting the temple and that the distance between said converging surfaces is much less than the width of the front and rear surfaces of said ends.

From the foregoing description, it will be seen that simple, efficient, and economical means and methods have been provided for accomplishing all the objects and advantages of the invention.

Having described my invention, I claim:

1. A lens supporting structure of the character described, said structure comprising a central bridge having rims on its opposed sides shaped to follow the nasal and top edge of respective lenses when assembled therewith, said rims on their temporal sides each having an outwardly extending temple connection end piece, said temple connection end pieces having a first recess extending longitudinally and to the outer end thereof and having a second recess of reduced lateral width communicating with said first recess and extending to the lens-edge-directed side of the rim, a temporal lens strap having a plate-like end portion lying in said first recess with an integrally formed long and narrow intermediate portion of reduced width disposed in the second recess, said long and narrow intermediate portion of the temporal lens strap terminating in an angled ear portion adapted to be connected with the adjacent temporal portion of a lens, and a perforated hinge plate overlying said plate-like end portion of the temporal lens strap in substantial alignment therewith, said hinge plate having hinge ears adjacent its outer end for connection with a temple, and pin-like connection means extending through the perforations in said aligned hinge plate and plate-like end portion of the temporal lens strap and into the body of the temple connection end piece for securing said hinge plate and temporal lens strap in fixed relation with said temple connection end piece, and means on the nasal sides of said rims for connection with the nasal portion of said lenses.

2. An ophthalmic mounting of the character described comprising a pair of lenses and a central bridge having rims on its opposed sides shaped to contiguously follow the nasal and top edge of said lenses, said rims on their temporal sides each having an outwardly extending temple connection end piece, said temple connection end pieces having a first recess extending longitudinally of and to the outer end thereof, a second recess of reduced lateral width communicating with said first recess, and extending to the lens-edge-directed side of the rim, a temporal lens strap having a plate-like end portion lying in said first recess with an integrally formed long and narrow flexible intermediate portion of reduced width disposed in the second recess, the depth of said second recess being greater than the thickness of said intermediate portion of the lens strap to permit flexing thereof, and said long and narrow intermediate portion of the temporal lens strap terminating in an angled end portion connected with the adjacent temporal portion of a respective lens, a perforated hinge plate overlying said plate-like end portion of the temporal lens strap in substantial alignment therewith, said hinge plate having hinge ears adjacent its outer end for connection with a temple, and pin-like connection means extending through the perforations in said aligned hinge plate and plate-like end portion of the temporal lens strap and into the body of the temple connection end piece for securing said hinge plate and temporal lens strap in fixed relation with said temple connection end piece, and means on the nasal sides of said rims connecting the nasal portion of said lenses with the rims.

3. A lens supporting structure of the character described, said structure comprising a central bridge having rims on its opposed sides shaped to follow the nasal and top edge of respective lenses when assembled therewith, said rims, on their temporal sides, each having an outwardly extending temple connection endpiece, said temple connection endpieces having in their rear surface a recess extending from adjacent the outer end thereof to the lens edge-directed side thereof, and a member having a perforated plate-like portion lying in said recess, an integrally formed intermediate portion of a width less than the adjacent dimension of the plate-like portion extending outwardly thereof toward the lens and terminating in an enlarged integral ear portion deflected in a sidewise direction with respect to the plane of the plate-like portion, said ear portion having a perforation therein to receive means extendable therethrough for connection with an opening in the temporal portion of said lens, a perforated hinge plate of a width lying within the limits of the width of said plate-like portion and that portion of the recess in which said plate-like portion is positioned and disposed in overlying relation with said plate-like portion, and pin-like connection means extending through the perforations in said aligned hinge plate, the plate-like portion and into the body of the temple connection endpiece for securing said hinge plate and said plate-like portion in fixed relation with said temple connection endpiece, and means on the nasal sides of said rims for connection with the nasal portions of said lenses.

4. A lens supporting structure of the character described, said structure comprising a central bridge having rims on its opposed sides shaped to follow the nasal and top edge of respective lenses when assembled therewith, said rims on their temporal sides, each having an outwardly extending temple connection endpiece, said temple connection endpieces having in their rear surface a recess extending from adjacent the outer end thereof toward the lens edge-directed side thereof, and a pair of perforated plate-like portions of substantially the same width disposed in said recess, said plate-like portions being disposed in superimposed relation with their peripheral edges and perforations in substantially coincident relation, one of said portions embodying a hinge plate having hinge ears for connection with a temple and the other having integrally formed therewith a portion extending outwardly therefrom and terminating in an ear portion to overlie the surface of the lens to be connected therewith, said outwardly extending portion being of a width less than the adjacent dimension of the plate-like portions and said ear portion being deflected in a sidewise direction with respect to the plane of the plate-like portion and being perforated to receive means extendable therethrough for connection with the adjacent temporal portion of a lens, and pin-like connection means extending through the perforations in said aligned plate-like portions and into the body of the temple connection endpiece for securing said plate-like portions in fixed relation with said temple connection endpiece, and means on the nasal sides of said rims for connection with the nasal portion of said lenses.

EDWARD M. SPLAINE.

REFERENCES CITED

The following references are of record in the file of this patent:

UNITED STATES PATENTS

| Number | Name | Date |
| --- | --- | --- |
| D. 141,743 | Rohrbach | July 31, 1945 |
| 1,971,128 | Braucht et al. | Aug. 21, 1934 |
| 2,034,326 | Brown | Mar. 17, 1936 |
| 2,301,328 | Rochte | Nov. 10, 1942 |
| 2,355,053 | Carlson | Aug. 8, 1944 |
| 2,357,267 | Rohrbach | Aug. 29, 1944 |
| 2,372,059 | Cook | Mar. 20, 1945 |
| 2,436,606 | Rohrbach | Feb. 24, 1948 |
| 2,463,956 | Ellestadt | Mar. 8, 1949 |